United States Patent
Cao

(10) Patent No.: US 9,961,616 B2
(45) Date of Patent: May 1, 2018

(54) NETWORK ACCESS METHOD AND MOBILE COMMUNICATION TERMINAL

(71) Applicant: GUANGDONG OPPO MOBILE TELECOMMUNICATIONS CORP., LTD., Dongguan (CN)

(72) Inventor: Jun Cao, Dongguan (CN)

(73) Assignee: Guangdong Oppo Mobile Telecommunications Corp., Ltd., Dongguan, Guangdong (CN)

(*) Notice: Subject to any disclaimer, the term of this patent is extended or adjusted under 35 U.S.C. 154(b) by 0 days. days.

(21) Appl. No.: 15/493,923

(22) Filed: Apr. 21, 2017

(65) Prior Publication Data

US 2017/0230899 A1    Aug. 10, 2017

Related U.S. Application Data

(63) Continuation of application No. PCT/CN2016/085891, filed on Jun. 15, 2016.

(30) Foreign Application Priority Data

Jun. 19, 2015  (CN) .......................... 2015 1 0347470

(51) Int. Cl.
*H04W 4/00* (2018.01)
*H04W 48/14* (2009.01)
(Continued)

(52) U.S. Cl.
CPC .......... *H04W 48/14* (2013.01); *G06K 7/1417* (2013.01); *G06K 19/06037* (2013.01);
(Continued)

(58) Field of Classification Search
CPC ..... H04W 48/14; H04W 48/18; H04W 64/00; H04W 84/042; G06K 7/1417; G06K 19/06112; G06K 19/06037
(Continued)

(56) References Cited

U.S. PATENT DOCUMENTS

| 2006/0211420 | A1 | 9/2006 | Ophir et al. |
| 2007/0184825 | A1 | 8/2007 | Lim et al. |
| 2016/0157168 | A1* | 6/2016 | Xue ............... H04W 48/18 370/329 |

FOREIGN PATENT DOCUMENTS

| CN | 101657005 A | 2/2010 |
| CN | 101827429 A | 9/2010 |

(Continued)

OTHER PUBLICATIONS

International Search Report (including English translation) issued in corresponding International Application No. PCT/CN2016/085891, dated Jul. 26, 2016, 4 pages.

*Primary Examiner* — Amancio Gonzalez

(74) *Attorney, Agent, or Firm* — Young Basile Hanlon & MacFarlane, P.C.

(57) ABSTRACT

A network access method and a mobile communication terminal are provided. The mobile communication terminal determines the current location of the mobile communication terminal, receives a graphical two-dimensional barcode transmitted by another mobile communication terminal bound with the mobile communication terminal, decodes the graphic two-dimensional barcode to acquire an equivalent home public land mobile network (EHPLMN) list to which the graphic two-dimensional barcode points, and performs network access according to the EHPLMN list when the mobile communication terminal detects that the EHPLMN list contains a network identifier of a public land mobile network (PLMN) corresponding to the current location.

20 Claims, 5 Drawing Sheets

(51) Int. Cl.
*H04W 64/00* (2009.01)
*H04W 48/18* (2009.01)
*G06K 19/06* (2006.01)
*G06K 7/14* (2006.01)
*H04W 84/04* (2009.01)

(52) U.S. Cl.
CPC ....... *G06K 19/06112* (2013.01); *H04W 48/18* (2013.01); *H04W 64/00* (2013.01); *H04W 84/042* (2013.01)

(58) Field of Classification Search
USPC .......................................................... 455/434
See application file for complete search history.

(56) References Cited

FOREIGN PATENT DOCUMENTS

| | | |
|---|---|---|
| CN | 103906180 A | 7/2014 |
| CN | 104853404 A | 8/2015 |
| CN | 104902542 A | 9/2015 |
| CN | 104980997 A | 10/2015 |
| CN | 104994563 A | 10/2015 |
| EP | 1703752 A2 | 9/2006 |

* cited by examiner

NETWORK ACCESS METHOD AND MOBILE COMMUNICATION TERMINAL

CROSS REFERENCE TO RELATED APPLICATIONS

This application is a continuation application of PCT Patent Application No. PCT/CN2016/085891, filed on Jun. 15, 2016, which claims priority to Chinese Patent Application No. 201510347470.X, filed on Jun. 19, 2015, the entire contents of both of which are hereby incorporated by reference in their entireties.

TECHNICAL FIELD

The present disclosure relates to mobile communication technical field, and particularly to a network access method and a mobile communication terminal.

BACKGROUND

Public land mobile networks (PLMNs) are networks established and operated by governments or operators authorized by the governments for the purpose of providing land mobile telecommunication services to the public. The PLMNs are usually interconnected with public switched telephone networks (PSTNs) to form a communication network of the whole area or whole country.

An identifier of the PLMN is generally a series of digital codes, for example, the network identifier of the PLMN of China Mobile is 46000, and the network identifier of the PLMN of China Unicom is 46001. Users may communicate conveniently and rapidly via mobile networks provided by operators. With the improvement of people's living standard, users carrying communication terminal devices are becoming more and more. When a user inserts a new user identification card into a mobile communication terminal for the first time or roams to other visited places, the mobile communication terminal (for example, a mobile phone, and so on) needs to perform network search to acquire the network identifier of the PLMN. However, when the new user identification card is inserted into the mobile communication terminal for the first time, or when the user roams to other visited places, the mobile communication terminal needs to take a long time (sometimes it may take a few minutes or more) to search a network, and only when the mobile communication terminal successfully finds a network, the mobile communication terminal may access the PLMN of the current location, which will affect user communication experience.

BRIEF DESCRIPTION OF THE DRAWINGS

To better illustrate the technical solution of embodiments of the present disclosure, the following descriptions will briefly illustrate the accompanying drawings described in the embodiments. Obviously, the following described accompanying drawings are some embodiments of the present disclosure. Persons skilled in the art may derive other accompanying drawings according to the described accompanying drawings without creative efforts.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

The technical solution of embodiments of the present disclosure will be described clearly and completely in combination with the accompanying drawings of the embodiments of the present disclosure. Obviously, the described embodiments are a part of embodiments of the present disclosure, and not all of the embodiments. According to the embodiments of the present disclosure, other embodiments obtained by persons skilled in the art without creative efforts all fall within the protection scope of the present disclosure.

Embodiments of the present disclosure disclose a network access method and a mobile communication terminal. In the embodiments of the present disclosure, the mobile communication terminal may perform network access according to an equivalent home public land mobile network (EHPLMN) list in which a network identifier of a public land mobile network (PLMN) corresponding to the current location has been added. PLMNs whose network identities are stored in the EHPLMN list are regarded to be equivalent to some extent by the mobile communication terminal. Therefore, when the mobile communication terminal performs network access according to the EHPLMN list, the probability that network search hits a certain PLMN whose network identifier is stored in the EHPLMN list may be increased. Therefore, the probability that the mobile communication terminal accesses a network at the current location is increased, which helps to reduce user communication waiting time (ideally, the mobile communication terminal may only take a few seconds to complete network access), and further helps to enhance user communication experience.

Figure 1:
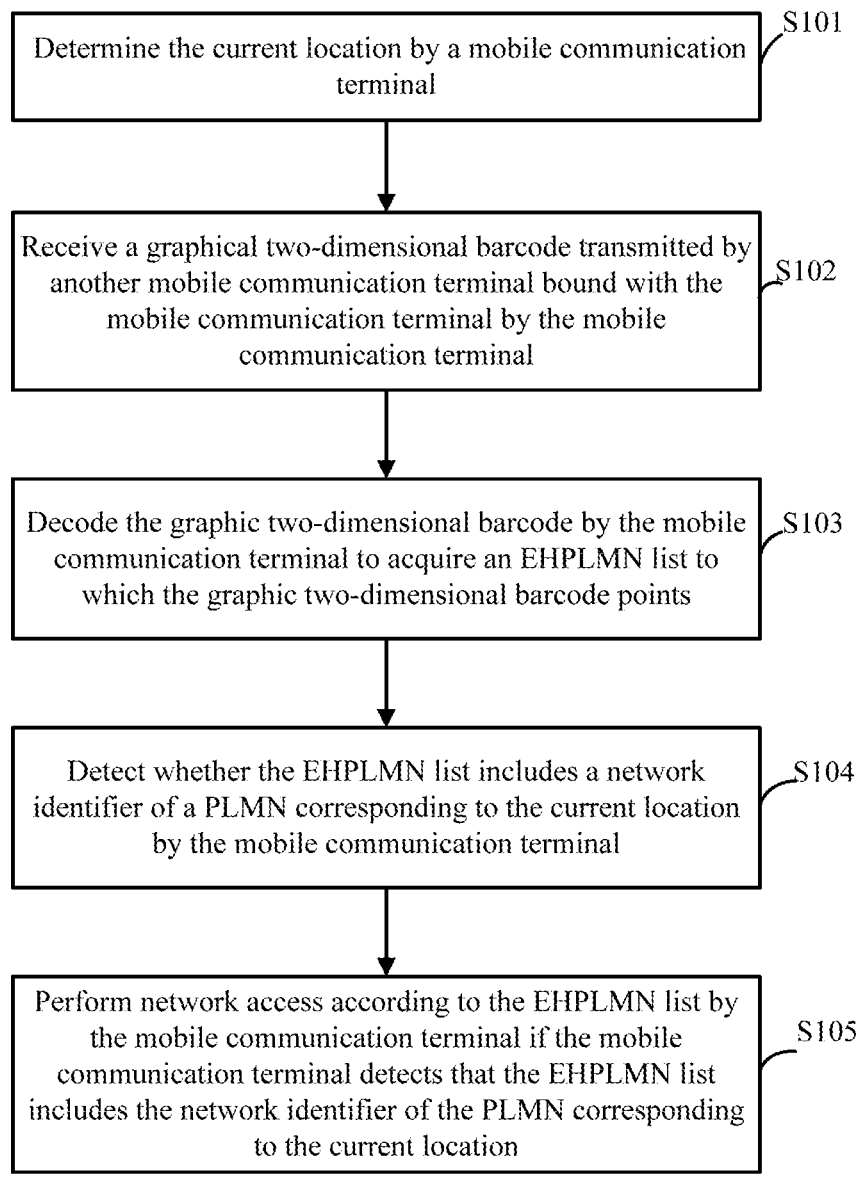
FIG. 1 is a flow chart of a network access method in accordance with one or more embodiments of the present disclosure.

FIG. 1 is a flow chart of a network access method in accordance with one or more embodiments of the present disclosure. The method illustrated in FIG. 1 may be applied in mobile communication terminals (in other words, mobile terminals, or terminals) having a network access function, for example, smart phones (for example, Android mobile phones, iOS mobile phones, and so on), tablet computers, handheld computers, mobile internet devices (MIDs), personal digital assistants (PDAs), and so on. As illustrated by FIG. 1, the network access method may begin at block 101.

At block 101, a mobile communication terminal determines the current location of the mobile communication terminal.

In one or more embodiments of the present disclosure, the mobile communication terminal may acquire the current location by a global positioning system (GPS), and may also acquire the current location by network positioning when connected to an external network.

In one or more embodiments of the present disclosure, the current location includes current location information. The current location information may be the longitude of the current location and the latitude of the current location, may also be the name of a representative building at the current location, and may also be a traffic platform nearest to the current location, and the present disclosure is not limited thereto.

At block 102, the mobile communication terminal receives a graphical two-dimensional barcode transmitted by another mobile communication terminal bound with the mobile communication terminal.

In one or more embodiments of the present disclosure, a binding relationship between the mobile communication terminal and the other mobile communication terminal may be preset. The above two mobile communication terminals may be two mobile communication terminals having the same style and the same model, may also be two mobile communication terminals having the same style and different models, and may also be two mobile communication terminals having different styles, different models, and different types. The present disclosure is not limited to the types of the above two mobile communication terminals described above.

In one or more embodiments of the present disclosure, the above mobile communication terminal receives the graphical two-dimensional barcode transmitted by the other mobile communication terminal bound with the mobile communication terminal. The graphical two-dimensional barcode is a picture, which records data symbol information via black and white graphs distributed in a plane (two-dimensional directions) according to a certain rule with a certain geometric pattern. For coding, the concept of "0" and "1" bit stream which forms interior logic basic of a computer is skillfully used, and a number of geometric figures corresponding to binary data are used to represent literal and numeric information, and image input devices or photoelectric scanning devices are used to automatically read the information to realize automatic information processing. The graphic two-dimensional barcode has some common characteristics of barcode technology: each code system has its own specific character set; each character occupies a certain width; the graphic two-dimensional barcode has a certain check function, and so on. Besides, the graphic two-dimensional barcode has an automatic identification function for information of different lines, and may process graphics rotation change points.

At block 103, the mobile communication terminal decodes the graphic two-dimensional barcode to acquire an EHPLMN list to which the graphic two-dimensional barcode points.

In one or more embodiments of the present disclosure, EHPLMNs are a set of PLMNs equivalent to home public land mobile networks (HPLMNs) of a smart terminal. The PLMN of the current location is stored into the EHPLMN list, thus the priority of the PLMN of the current location is increased, and the efficiency that the smart terminal in the current location establishes a network connection is increased.

In one or more embodiments of the present disclosure, the graphic two-dimensional barcode may be a uniform resource locator (URL) which points to the EHPLMN list. The URL is a simple representation for a location and an access method of resources which may be obtained from the Internet, and is an address of standard resources of the Internet. Each file of the Internet has a unique URL, and the information of the URL indicates the location of the file and how a browser shall process the file.

Specifically, when the mobile communication terminal receives the graphic two-dimensional barcode transmitted by the other mobile communication terminal bound with the mobile communication terminal, the mobile communication terminal may decode the graphic two-dimensional barcode to acquire the EHPLMN list to which the graphic two-dimensional barcode points.

At block 104, the mobile communication terminal detects whether the EHPLMN list contains a network identifier of a PLMN corresponding to the current location.

In one or more embodiments of the present disclosure, the PLMNs are networks established and operated by governments or operators authorized by the governments for the purpose of providing land mobile telecommunication services to the public. The PLMNs are usually interconnected with public switched telephone networks (PSTNs) to form a communication network of the whole area or whole country. PLMN=mobile country code (MCC)+mobile network code (MNC), for example, the PLMN of China Mobile is 46000, and the PLMN of China Unicom is 46001. The PLMNs are wireless communication systems intended for use by terrestrial subscribers on land (for example, in vehicles or on foot). Such a system may stand alone; however, it is usually interconnected with the PSTNs. However, mobile and portable Internet subscribers are also becoming common. An ideal PLMN system provides corresponding services to mobile and portable subscribers and fixed networks, and it is a special challenge in areas of complex topography, as it is difficult to find and maintain a base station. In an urban environment, many obstacles exist, for example, buildings and various radio frequencies may cause noise and interference of radiation. Currently, most systems use digital technology rather than past analogue technology. Such a transition has improved communication quality and reliability, but it's not perfect yet.

In one or more embodiments of the present disclosure, the EHPLMN list contains pre-stored location information and network identifiers of PLMNs matching with the location information.

At block 105, when the mobile communication terminal detects that the EHPLMN list contains the network identifier of the PLMN corresponding to the current location, the mobile communication terminal performs network access according to the EHPLMN list.

In one or more embodiments of the present disclosure, when the mobile communication terminal detects that the EHPLMN list contains the network identifier of the PLMN corresponding to the current location, it indicates that the network identifier of the PLMN corresponding to the current location is preset in the EHPLMN list. Thus, the mobile communication terminal may find the PLMN corresponding to the network identifier according to the network identifier, and access the PLMN.

In FIG. 1, the mobile communication terminal determines the current location first, and then receives the graphic two-dimensional barcode transmitted by the other mobile communication terminal bound with the mobile communication terminal, and then decodes the graphic two-dimensional barcode to acquire the EHPLMN list to which the graphic two-dimensional barcode points. The mobile communication terminal then detects whether the EHPLMN list contains the network identifier of the PLMN corresponding to the current location. Last, when it is detected that the EHPLMN list contains the network identifier of the PLMN corresponding to the current location, the mobile communication terminal performs network access according to the EHPLMN list.

In the present disclosure, the mobile communication terminal may perform network access according to the EHPLMN list in which the network identifier of the PLMN corresponding to the current location has been added. The PLMNs whose network identifiers are stored in the EHPLMN list are regarded to be equivalent to some extent by the mobile communication terminal. Therefore, when the mobile communication terminal performs network access according to the EHPLMN list, the probability that network search hits a certain PLMN whose network identifier is stored in the EHPLMN list may be improved. Therefore, the probability that the mobile communication terminal accesses a network at the current location is increased, which helps to reduce user communication waiting time (ideally, the mobile communication terminal may only take a few seconds to complete network access), and further helps to enhance user communication experience.

Figure 2:
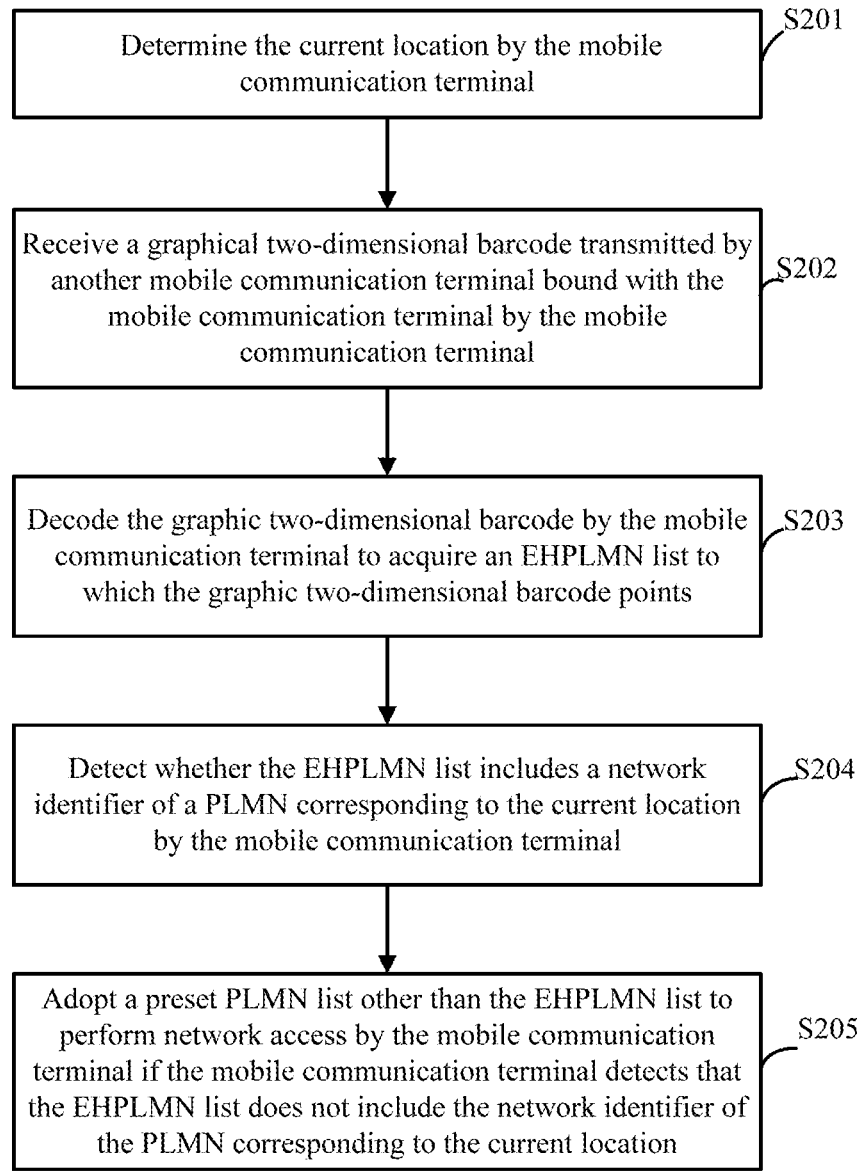
FIG. 2 is a flow chart of another network access method in accordance with one or more embodiments of the present disclosure.

FIG. 2 is a flow chart of another network access method in accordance with one or more embodiments of the present disclosure. As illustrated by FIG. 2, the network access method may begin at block 201.

At block 201, the mobile communication terminal determines the current location of the mobile communication terminal. The process at block 201 may correspond to the process at block 101 of FIG. 1

In one or more embodiments of the present disclosure, after the mobile communication terminal determines the current location of the mobile communication terminal, the method may further include the following processes.

21) The mobile communication terminal detects whether a pre-stored EHPLMN list contains a network identifier of a PLMN corresponding to the current location.

22) When the mobile communication terminal detects that the pre-stored EHPLMN list does not contain the network identifier of the PLMN corresponding to the current location, the mobile communication terminal transmits a sharing request to another mobile communication terminal bound with the mobile communication terminal, whereby the other mobile communication terminal transmits the graphic two-dimensional barcode containing the EHPLMN list to the mobile communication terminal.

In one or more embodiments of the present disclosure, the EHPLMN list may be pre-stored in the mobile communication terminal. The pre-stored EHPLMN list may be stored according to user settings, and may also be stored by the mobile communication terminal according to history connection records of connecting the PLMN by the mobile communication terminal.

In one or more embodiments of the present disclosure, only when the mobile communication terminal detects that the pre-stored EHPLMN list does not contain the network identifier of the PLMN corresponding to the current location, the mobile communication terminal transmits the sharing request to the other mobile communication terminal bound with the mobile communication terminal, whereby the other mobile communication terminal transmits the graphic two-dimensional barcode containing the EHPLMN list to the mobile communication terminal.

At block 202, the mobile communication terminal receives the graphic two-dimensional barcode transmitted by the other mobile communication terminal bound with the mobile communication terminal. The process at block 202 may correspond to the process at block 102 of FIG. 1

At block 203, the mobile communication terminal decodes the graphic two-dimensional barcode to acquire an EHPLMN list to which the graphic two-dimensional barcode points. The process at block 203 may correspond to the process at block 103 of FIG. 1

At block 204, the mobile communication terminal detects whether the EHPLMN list contains the network identifier of the PLMN corresponding to the current location. The process at block 204 may correspond to the process at block 104 of FIG. 1

At block 205, when the mobile communication terminal detects that the EHPLMN list does not contain the network identifier of the PLMN corresponding to the current location, the mobile communication terminal adopts a preset PLMN list other than the EHPLMN list to perform network access.

In one or more embodiments of the present disclosure, a list which may be used as a basis for network access may be preset in the mobile communication terminal, for example, the EPLMN list. The EPLMN is the PLMN equivalent to the PLMN currently selected by the mobile communication terminal, and they have the same priority. The EPLMN is mainly used to solve user residence and roaming policies between a shared network and an original network. Operators may configure EPLMNs, and communication network resource sharing may be realized among these EPLMNs. From a business perspective, communication network resource sharing may be realized among network resources of different operators or different PLMNs defined by the same operator.

In one or more embodiments of the present disclosure, the EPLMN list may be a list relationship set according to network standards supported by the mobile communication terminal, and may also be a list relationship set according to location information variations, for example, from a visited place to a visited place, from a home to a visited place, and from a visited place to a home.

In one or more embodiments of the present disclosure, when the EPLMN list is the list relationship set according to the network standards supported by the mobile communication terminal, and is for recognizing new subscribers, the method may include the following processes.

31) The mobile communication terminal detects the type of a user identification card inserted into the mobile communication terminal for the first time.

32) PLMNs of network standards supported by the mobile communication terminal are determined according to the type of the user identification card.

33) Network identifiers of the PLMNs of the network standards supported by the mobile communication terminal are added to the pre-stored EPLMN list.

Correspondingly, in the above block 205, adopting the preset PLMN list other than the EHPLMN list to perform network access includes: when a PLMN other than the EHPLMN list and matching with a network identifier pre-stored in the EPLMN list is found, establishing a communication connection between the mobile communication terminal and the PLMN matched.

In one or more embodiments of the present disclosure, the network identifier may include a network number section. For example, China Mobile includes four number sections, respectively 46000, 46002, 46007, and 46008; China Unicom includes three number sections, respectively 46001, 46006, and 46009.

In one or more embodiments of the present disclosure, the method may further include the following process: the mobile communication terminal receives a network identifier of a PLMN transmitted by a base station before the mobile communication terminal performs network access according to the EHPLMN list.

In one or more embodiments of the present disclosure, the base station may constantly send out the network identifier of the PLMN of the current location, thus when the mobile communication terminal needs to access the PLMN of the current location, the mobile communication terminal may receive the network identifier of the PLMN transmitted by the base station of the current location.

In an optional embodiment, when the mobile communication terminal detects that the EHPLMN list contains the network identifier of the PLMN corresponding to the current location, the process that the mobile communication terminal performs network access according to the EHPLMN list may include the following: when the mobile communication terminal detects that the EHPLMN list contains the network identifier of the PLMN corresponding to the current location, the mobile communication terminal detects whether the EHPLMN list contains the received network identifier of the PLMN; and when the mobile communication terminal detects that the EHPLMN list contains the received network identifier of the PLMN, the mobile communication terminal accesses a network corresponding to the received network identifier of the PLMN.

In one or more embodiments of the present disclosure, only when the received network identifier of the PLMN matches with the network identifier preset in the EHPLMN list, the mobile communication terminal may perform network access according to the network identifier matched.

In one or more embodiments of the present disclosure, the method may further include the following: the mobile communication terminal incorporates the EHPLMN list transmitted by the other mobile communication terminal bound with the mobile communication terminal into the EHPLMN list already stored in the mobile communication terminal.

In one or more embodiments of the present disclosure, to avoid redundancy of the EHPLMN list due to repetition of the same network identifier, the mobile communication terminal may incorporate the received EHPLMN list into the pre-stored EHPLMN list in a preset incorporation manner, thereby ensuring that the new EHPLMN list is not redundant.

In FIG. 2, the process of presetting the PLMN list other than the EHPLMN list in the mobile communication terminal is described in detail. In one or more embodiments of the present disclosure, when the mobile communication terminal cannot successfully access the PLMN according to the preset EHPLMN list or the received EHPLMN list, the mobile communication terminal may perform network access according to another PLMN list. The PLMNs whose network identifiers are stored in the other PLMN list are regarded to be equivalent to some extent by the mobile communication terminal, thus, when the mobile communication terminal performs network access according to the other PLMN list, the probability that network search hits a certain PLMN which network identifier is stored in the PLMN list may be improved. Therefore, the probability that the mobile communication terminal accesses a network at the current location is increased, which helps to reduce user communication waiting time (ideally, the mobile communication terminal may only take a few seconds to complete network access), and further helps to enhance user communication experience.

Figure 3:
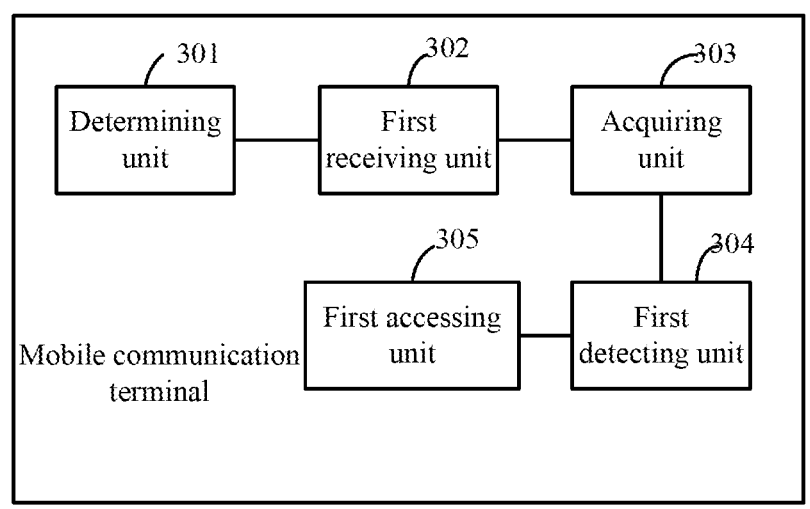
FIG. 3 is a structure diagram of a mobile communication terminal in accordance with one or more embodiments of the present disclosure.

Referring to FIG. 3, FIG. 3 is a structure diagram of a mobile communication terminal in accordance with one or more embodiments of the present disclosure, and the mobile communication terminal is used to execute the above network access method. The mobile communication terminal illustrated in FIG. 3 may include but not limited to mobile communication terminals having a network access function, for example, smart phones (for example, Android mobile phones, iOS mobile phones, and so on), tablet computers, handheld computers, mobile interne devices (MIDs), personal digital assistants (PDAs), and so on. As illustrated by FIG. 3, the mobile communication terminal may include a determining unit 301, a first receiving unit 302, an acquiring unit 303, a first detecting unit 304, and a first accessing unit 305. The determining unit 301 may be realized by a determining circuit for example, the first receiving unit 302 may be realized by a receiver or a receiving circuit for example, the acquiring unit 303 may be realized by an acquiring circuit for example, the first detecting unit 304 may be realized by a detector or a detecting circuit for example, and the first accessing unit 305 may be realized by an accessor or an accessing circuit for example.

The determining unit 301 is configured to determine the current location of the mobile communication terminal.

In one or more embodiments of the present disclosure, the determining unit 301 may acquire the current location by a global positioning system (GPS), and may also acquire the current location by network positioning when connected to an external network.

In one or more embodiments of the present disclosure, the current location includes current location information. The location information may be the longitude of the current location and the latitude of the current location, may also be the name of a representative building at the current location, and may also be a traffic platform nearest to the current location, and the present disclosure is not limited thereto.

The first receiving unit 302 is configured to receive a graphical two-dimensional barcode transmitted by another mobile communication terminal bound with the mobile communication terminal.

In one or more embodiments of the present disclosure, a binding relationship between the mobile communication terminal and the other mobile communication terminal may be preset. The above two mobile communication terminals may be two mobile communication terminals having the same style and the same model, may also be two mobile communication terminals having the same style and different models, and may also be two mobile communication terminals having different styles, different models, and different types. The present disclosure is not limited to the types of the above two mobile communication terminals described above.

In one or more embodiments of the present disclosure, the first receiving unit 302 receives the graphical two-dimensional barcode transmitted by the other mobile communication terminal bound with the mobile communication terminal. The graphical two-dimensional barcode is a picture, which records data symbol information via black and white graphs distributed in a plane (two-dimensional directions) according to a certain rule with a certain geometric pattern. For coding, the concept of "0" and "1" bit stream which forms interior logic basic of a computer is skillfully used, and a number of geometric figures corresponding to binary data are used to represent literal and numeric information, and image input devices or photoelectric scanning devices are used to automatically read the information to realize automatic information processing. The graphic two-dimensional barcode has some common characteristics of barcode technology: each code system has its own specific character set; each character occupies a certain width; the graphic two-dimensional barcode has a certain check function, and so on. Besides, the graphic two-dimensional barcode has an automatic identification function for information of different lines, and may process graphics rotation change points.

The acquiring unit 303 is configured to decode the graphic two-dimensional barcode received by the first receiving unit 302 to acquire an EHPLMN list to which the graphic two-dimensional barcode points.

In one or more embodiments of the present disclosure, EHPLMNs are a set of PLMNs equivalent to HPLMNs of a smart terminal. The PLMN of the current location is stored into the EHPLMN list, thus the priority of the PLMN of the current location is increased, and the efficiency that the smart terminal in the current location establishes a network connection is increased.

In one or more embodiments of the present disclosure, the graphic two-dimensional barcode may be a uniform resource locator (URL) which points to the EHPLMN list. The URL is a simple representation for a location and an access method of resources which may be obtained from the Internet, and is an address of standard resources of the Internet. Each file of the Internet has a unique URL, and the information of the URL indicates the location of the file and how a browser shall process the file.

Specifically, when the first receiving unit 302 receives the graphic two-dimensional barcode transmitted by the other mobile communication terminal bound with the mobile communication terminal, the acquiring unit 303 may decode the graphic two-dimensional barcode to acquire the EHPLMN list to which the graphic two-dimensional barcode points.

The first detecting unit 304 is configured to detect whether the EHPLMN list acquired by the acquiring unit 303 contains a network identifier of a PLMN corresponding to the current location.

In one or more embodiments of the present disclosure, the PLMNs are networks established and operated by governments or operators authorized by the governments for the purpose of providing land mobile telecommunication services to the public. The PLMNs are usually interconnected with PSTNs to form a communication network of the whole area or whole country. PLMN=MCC+MNC, for example, the PLMN of China Mobile is 46000, and the PLMN of China Unicom is 46001. The PLMNs are wireless communication systems intended for use by terrestrial subscribers on land (for example, in vehicles or on foot). Such a system may stand alone; however, it is usually interconnected with the PSTNs. However, mobile and portable Internet subscribers are also becoming common. An ideal PLMN system provides corresponding services to mobile and portable subscribers and fixed networks, and it is a special challenge in areas of complex topography as it is difficult to find and maintain a base station. In an urban environment, many obstacles exist, for example, buildings and various radio frequencies may cause noise and interference of radiation. Currently, most systems use digital technology rather than past analogue technology. Such a transition has improved communication quality and reliability, but it's not perfect yet.

In one or more embodiments of the present disclosure, the EHPLMN list contains pre-stored location information and network identifiers of PLMNs matching with the location information.

The first accessing unit 305 is configured to perform network access according to the EHPLMN list when the first detecting unit 304 detects that the EHPLMN list contains the network identifier of the PLMN corresponding to the current location.

In one or more embodiments of the present disclosure, when the first detecting unit 304 detects that the EHPLMN list contains the network identifier of the PLMN corresponding to the current location, it indicates that the network identifier of the PLMN corresponding to the current location is preset in the EHPLMN list. Thus, the first accessing unit 305 may find the PLMN corresponding to the network identifier according to the network identifier, and access the PLMN.

In FIG. 3, the determining unit 301 determines the current location first, and then the first receiving unit 302 receives the graphic two-dimensional barcode transmitted by the other mobile communication terminal bound with the mobile communication terminal, and then the acquiring unit 303 decodes the graphic two-dimensional barcode to acquire the EHPLMN list to which the graphic two-dimensional barcode points. The first detecting unit 304 then detects whether the EHPLMN list contains the network identifier of the PLMN corresponding to the current location. Last, when the first detecting unit 304 detects that the EHPLMN list contains the network identifier of the PLMN corresponding to the current location, the first accessing unit 305 performs network access according to the EHPLMN list. In one or more embodiments of the present disclosure, the first accessing unit 305 may perform network access according to the EHPLMN list in which the network identifier of the PLMN corresponding to the current location has been added. The PLMNs whose network identifiers are stored in the EHPLMN list are regarded to be equivalent to some extent by the mobile communication terminal. Therefore, when the mobile communication terminal performs network access according to the EHPLMN list, the probability that network search hits a certain PLMN whose network identifier is stored in the EHPLMN list may be increased.

Therefore, the probability that the first accessing unit 305 accesses a network at the current location is increased, which helps to reduce user communication waiting time (ideally, the mobile communication terminal may only take a few seconds to complete network access), and further helps to enhance user communication experience.

Figure 4:
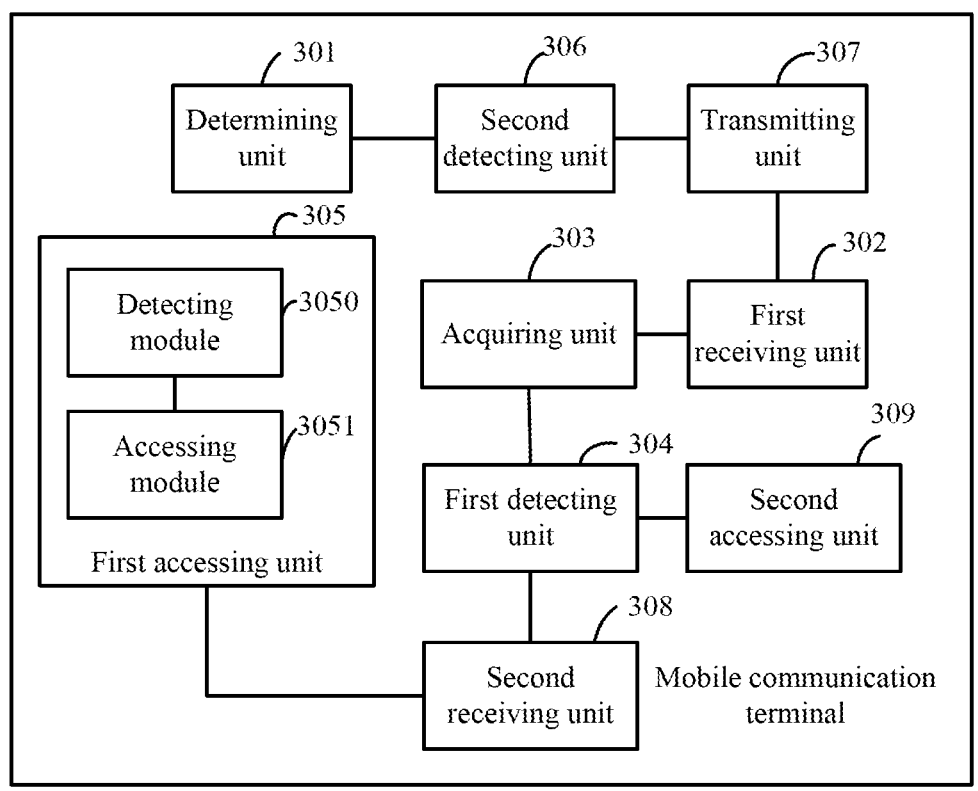
FIG. 4 is a structure diagram of another mobile communication terminal in accordance with one or more embodiments of the present disclosure.

FIG. 4 is a structure diagram of another mobile communication terminal in accordance with one or more embodiments of the present disclosure. The mobile communication terminal is used to execute the above network access method. FIG. 4 is obtained based on the detailing of FIG. 3. Besides all the units illustrated by FIG. 3, FIG. 4 may further include the following units: a second detecting unit 306, a transmitting unit 307, a second receiving unit 308, and a second accessing unit 309.

The second detecting unit 306 is configured to detect whether a pre-stored EHPLMN list contains a network identifier of a PLMN corresponding to the current location determined by the determining unit 301.

The transmitting unit 307 is configured to transmit a sharing request to another mobile communication terminal bound with the mobile communication terminal when the second detecting unit 306 detects that the pre-stored EHPLMN list does not contain the network identifier of the PLMN corresponding to the current location, whereby the other mobile communication terminal transmits the graphic two-dimensional barcode containing the EHPLMN list to the mobile communication terminal.

In one or more embodiments of the present disclosure, the EHPLMN list may be pre-stored in the mobile communication terminal. The pre-stored EHPLMN list may be stored according to user settings, and may also be stored by the mobile communication terminal according to history connection records of connecting the PLMN by the mobile communication terminal.

In one or more embodiments of the present disclosure, only when the second detecting unit 306 detects that the pre-stored EHPLMN list does not contain the network identifier of the PLMN corresponding to the current location, the transmitting unit 307 transmits the sharing request to the other mobile communication terminal bound with the mobile communication terminal, whereby the other mobile communication terminal transmits the graphic two-dimensional barcode containing the EHPLMN list to the mobile communication terminal.

In one or more embodiments of the present disclosure, when the other mobile communication terminal bound with the mobile communication terminal transmits the graphic two-dimensional barcode, the first receiving unit 302 may receive the graphic two-dimensional barcode transmitted by the other mobile communication terminal bound with the mobile communication terminal.

The second receiving unit 308 is configured to receive a network identifier of a PLMN transmitted by a base station.

The second accessing unit 309 is configured to adopt a preset PLMN list other than the EHPLMN list to perform network access when the first detecting unit 304 detects that the EHPLMN list does not contain the network identifier of the PLMN corresponding to the current location.

In one or more embodiments of the present disclosure, a list which may be used as a basis for network access may be preset in the mobile communication terminal, for example, the EPLMN list. The EPLMN is the PLMN equivalent to the PLMN currently selected by the mobile communication terminal, and they have the same priority. The EPLMN is mainly used to solve user residence and roaming policies between a shared network and an original network. Operators may configure EPLMNs, and communication network resource sharing may be realized among these EPLMNs. From a business perspective, communication network resource sharing may be realized among network resources of different operators or different PLMNs defined by the same operator.

In one or more embodiments of the present disclosure, the EPLMN list may be a list relationship set according to network standards supported by the mobile communication terminal, and may also be a list relationship set according to location information variations, for example, from a visited place to a visited place, from a home to a visited place, and from a visited place to a home.

In one or more embodiments of the present disclosure, when the EPLMN list is the list relationship set according to the network standards supported by the mobile communication terminal, and is for recognizing new subscribers, the second detecting unit 306 is further configured to detect the type of a user identification card inserted into the mobile communication terminal for the first time.

Correspondingly, the determining unit 301 is further configured to determine PLMNs of network standards supported by the mobile communication terminal according to the type of the user identification card, and add network identifiers of the PLMNs of the network standards supported by the mobile communication terminal to the pre-stored EPLMN list.

Correspondingly, when a PLMN other than the EHPLMN list and matching with a network identifier pre-stored in the EPLMN list is found, the second accessing unit 309 is configured to establish a communication connection between the mobile communication terminal and the PLMN matched.

In one or more embodiments of the present disclosure, the network identifier may include a network number section. For example, China Mobile includes four number sections, respectively 46000, 46002, 46007, and 46008; China Unicom includes three number sections, respectively 46001, 46006, and 46009.

In an optional embodiment, the first accessing unit 305 may further include a detecting module 3050 and an accessing module 3051.

The detecting module 3050 is configured to detect whether the EHPLMN list contains the received network identifier of the PLMN when the first detecting unit 304 detects that the EHPLMN list contains the received network identifier of the PLMN corresponding to the current location.

The accessing module 3051 is configured to access a network corresponding to the received network identifier of the PLMN when the detecting module 3050 detects that the EHPLMN list contains the received network identifier of the PLMN.

In one or more embodiments of the present disclosure, only when the received network identifier of the PLMN matches with the network identifier preset in the EHPLMN list, the mobile communication terminal may perform network access according to the matched network identifier.

In one or more embodiments of the present disclosure, the accessing module 3051 may be further configured to incorporate an EHPLMN list transmitted by the other mobile communication terminal bound with the mobile communication terminal into the EHPLMN list already stored in the mobile communication terminal.

In one or more embodiments of the present disclosure, to avoid redundancy of the EHPLMN list due to repetition of the same network identifier, the mobile communication terminal may incorporate the received EHPLMN list into the pre-stored EHPLMN list in a preset incorporation manner, thereby ensuring that the new EHPLMN list is not redundant.

In FIG. 4, the process of presetting the PLMN list other than the EHPLMN list in the mobile communication terminal is described in detail. Here, when the first accessing unit 305 cannot successfully access the PLMN according to the preset EHPLMN list or the received EHPLMN list, the second accessing unit 309 may perform network access according to another PLMN list. The PLMNs whose network identifiers are stored in the other PLMN list are regarded to be equivalent to some extent by the mobile communication terminal, thus, when the mobile communication terminal performs network access according to the other PLMN list, the probability that network search hits a certain PLMN which network identifier is stored in the PLMN list may be increased. Therefore, the probability that the mobile communication terminal accesses a network at the current location is increased, which helps to reduce user communication waiting time (ideally, the mobile communication terminal may only take several seconds to finish network access), and further helps to enhance user communication experience.

Specifically, the terminal illustrated in one or more embodiments of the present disclosure may execute a part of or all of processes of the network access method embodiments illustrated in combination with FIG. 1 and FIG. 2.

Figure 5:
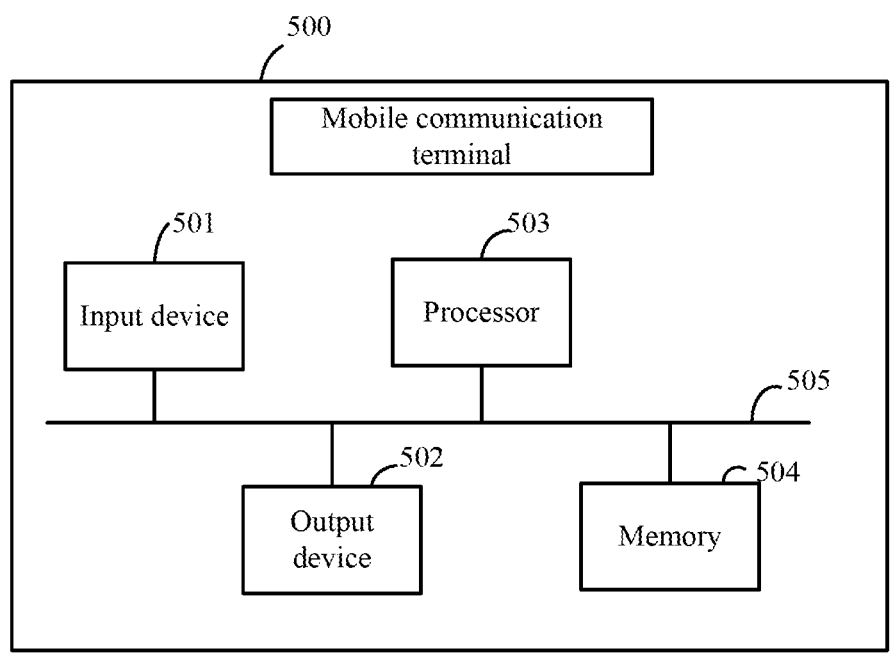
FIG. 5 is a structure diagram of a mobile communication terminal in accordance with one or more embodiments of the present disclosure.

FIG. 5 is a structure diagram of a mobile communication terminal in accordance with one or more embodiments of the present disclosure. The mobile terminal 500 includes at least one input device 501, at least one output device 502, at least one processor 503 (for example, CPU), and a memory 504. The input device 501, the output device 502, the processor 503, and the memory 504 are coupled together via a bus 505.

The input device 501 may include a touch panel, a touch screen, and a keyboard.

The output device 502 may be a liquid crystal display (LCD), a light emitting diode (LED) display, an organic light-emitting diode (OLED) display, and so on, and is configured to output and display information.

The memory 504 may be a high-speed random-access memory, and may also be a non-transitory memory, for example a disc memory. The memory 504 stores a set of program codes. The processor 503 is configured to invoke the program codes stored in the memory 504 to determine the current location of the mobile communication terminal, receive a graphical two-dimensional barcode transmitted by another mobile communication terminal bound with the mobile communication terminal, decode the graphic two-dimensional barcode to acquire an EHPLMN list to which the graphic two-dimensional barcode points, and perform network access according to the EHPLMN list when the mobile communication terminal detects that the EHPLMN list contains the network identifier of the PLMN corresponding to the current location.

In some feasible embodiments, the processor 503 is further configured to invoke the program codes to receive a network identifier transmitted by a base station, detect whether the EHPLMN list contains a network identifier of a PLMN corresponding to the current location when it is detected that the EHPLMN list contains the network identifier corresponding to the current location, and access a network corresponding to the received network identifier of the PLMN when it is detected that the EHPLMN list contains the received network identifier of the PLMN.

In some feasible embodiments, the processor 503 is further configured to invoke the program codes to adopt a preset PLMN list other than the EHPLMN list to perform network access when it is detected that the EHPLMN list does not contain the network identifier of the PLMN corresponding to the current location.

In some feasible embodiments, the processor 503 is further configured to invoke the program codes to detect whether a pre-stored EHPLMN list contains the network identifier of the PLMN corresponding to the current location, and transmit a sharing request to the other mobile communication terminal bound with the mobile communication terminal when it is detected that the pre-stored EHPLMN list does not contain the network identifier of the PLMN corresponding to the current location, whereby the other mobile communication terminal transmits the graphic two-dimensional barcode containing the EHPLMN list to the mobile communication terminal.

In some feasible embodiments, the processor 503 is further configured to invoke the program codes to detect the type of a user identification card inserted into the mobile communication terminal for the first time, determine PLMNs of network standards supported by the mobile communication terminal according to the type of the user identification card, and add network identifiers of the PLMNs of the network standards supported by the mobile communication terminal to the pre-stored EPLMN list.

In some feasible embodiments, when a PLMN other than the EHPLMN list and matching with a network identifier pre-stored in the EPLMN list is found, the processor 503 is further configured to invoke the program codes to establish a communication connection between the mobile communication terminal and the PLMN matched.

In some feasible embodiments, the processor 503 is further configured to invoke the program codes to incorporate an EHPLMN list transmitted by the other mobile communication terminal bound with the mobile communication terminal into the EHPLMN list already stored in the mobile communication terminal.

Furthermore, based on the network access method provided by the embodiment illustrated by FIG. 1 or FIG. 2, the present disclosure further provides a non-transitory computer storage medium storing one or more programs. When the one or more programs are executed by a mobile communication terminal, the mobile communication terminals executes the network access method illustrated in FIG. 1 or FIG. 2.

The modules or sub-modules of all embodiments of the present disclosure may be realized by a universal integrated circuit, for example, a central processing unit (CPU), or an application specific integrated circuit (ASIC).

According to actual needs, the order of the steps of the methods in the embodiments of the present disclosure may be adjusted, some steps may be merged into one step, and some step may be deleted.

According to actual needs, some units of the terminals in the embodiments of the present disclosure may be merged into one unit, some unit may be divided into several units, and some unit may be deleted.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

Reference throughout this specification to "one embodiment," "an embodiment," "exemplary embodiment," or the like in the singular or plural means that one or more particular features, structures, or characteristics described in connection with an example is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Those skilled in the art may understand that all of or a part of procedures may be accomplished by using a computer program to instruct related hardware. The program may be stored in a computer-readable storage medium. When the program is executed, the procedures of the embodiments of the above-mentioned methods may be included. Wherein, the storage medium may be a magnetic disk, an optical disk, a ROM (Read-Only Memory, ROM), a RAM (Random Access Memory, RAM), or the like.

The embodiments described above are merely preferred ones of the present disclosure but are not limitations to the protection scope of the present disclosure, thus equivalent variations made according to the appended claims of the present disclosure still fall within the scope of the present disclosure.

What is claimed is:

1. A method, comprising:
   determining, by a mobile communication terminal, the current location of the mobile communication terminal;
   receiving, by the mobile communication terminal, a graphical two-dimensional barcode transmitted by another mobile communication terminal in communication with the mobile communication terminal;
   decoding, by the mobile communication terminal, the graphic two-dimensional barcode to acquire an equivalent home public land mobile network (EHPLMN) list to which the graphic two-dimensional barcode points; and
   performing, by the mobile communication terminal, network access according to the EHPLMN list when the mobile communication terminal detects that the EHPLMN list contains a network identifier of a PLMN corresponding to the current location.

2. The method of claim 1 further comprising:
   receiving, by the mobile communication terminal, a network identifier of a PLMN transmitted by a base station before performing network access according to the EHPLMN list;
   when the mobile communication terminal detects that the EHPLMN list contains the network identifier of the PLMN corresponding to the current location, performing network access according to the EHPLMN list comprises:
   detecting, by the mobile communication terminal, whether the EHPLMN list contains the network identifier of the PLMN received by the mobile communication terminal when the mobile communication terminal detects that the EHPLMN list contains the network identifier of the PLMN corresponding to the current location; and
   accessing, by the mobile communication terminal, a network corresponding to the network identifier of the PLMN received by the mobile communication terminal when the mobile communication terminal detects that the EHPLMN list contains the network identifier of the PLMN received by the mobile communication terminal.

3. The method of claim 1 further comprising:
   adopting, by the mobile communication terminal, a preset PLMN list other than the EHPLMN list to perform network access when the mobile communication terminal detects that the EHPLMN list does not contain the network identifier of the PLMN corresponding to the current location.

4. The method of any of claims 1 further comprising:
   transmitting, by the mobile communication terminal, a sharing request to the other mobile communication terminal in communication with the mobile communication terminal when the mobile communication terminal detects that a pre-stored EHPLMN list does not contain the network identifier of the PLMN corresponding to the current location, whereby the other mobile communication terminal transmits the graphic two-dimensional barcode containing the EHPLMN list to the mobile communication terminal.

5. The method of claim 4 further comprising:
   detecting, by the mobile communication terminal, the type of a user identification card inserted into the mobile communication terminal for the first time;
   determining, by the mobile communication terminal, PLMNs of network standards supported by the mobile communication terminal according to the type of the user identification card; and
   adding, by the mobile communication terminal, network identifiers of the PLMNs of the network standards supported by the mobile communication terminal to the pre-stored EPLMN list.

6. The method of claim 5, wherein adopting the preset PLMN list other than the EHPLMN list to perform network access comprises:
   when a PLMN other than the EHPLMN list and matching with a network identifier of the pre-stored EHPLMN list is found, establishing a communication connection between the mobile communication terminal and the PLMN matched.

7. The method of claim 1 further comprising:
   incorporating, by the mobile communication terminal, an EHPLMN list transmitted by the other mobile communication terminal in communication with the mobile communication terminal into the EHPLMN list already stored in the mobile communication terminal.

8. A mobile communication terminal, comprising:
   a processor; and
   a non-transitory memory storing a set of program codes, the set of program codes when executed by the processor causing the processor to:
   determine the current location of the mobile communication terminal;
   receive a graphical two-dimensional barcode transmitted by another mobile communication terminal in communication with the mobile communication terminal;
   decode the graphic two-dimensional barcode to acquire an equivalent home public land mobile network (EH-PLMN) list to which the graphic two-dimensional barcode points; and
   perform network access according to the EHPLMN list when the mobile communication terminal detects that the EHPLMN list contains a network identifier of a PLMN corresponding to the current location.

9. The mobile communication terminal of claim 8, wherein the processor is further configured to invoke the set of program codes to:
   receive a network identifier of a PLMN transmitted by a base station before performing network access according to the EHPLMN list, detect whether the EHPLMN list contains the network identifier of the PLMN received by the mobile communication terminal when the mobile communication terminal detects that the EHPLMN list contains the network identifier of the PLMN corresponding to the current location, and access a network corresponding to the network identifier of the PLMN received by the mobile communication terminal when the mobile communication terminal detects that the EHPLMN list contains the network identifier of the PLMN received by the mobile communication terminal.

10. The mobile communication terminal of claim 8, wherein the processor is further configured to invoke the set of program codes to adopt a preset PLMN list other than the EHPLMN list to perform network access when the mobile communication terminal detects that the EHPLMN list does not contain the network identifier of the PLMN corresponding to the current location.

11. The mobile communication terminal of claim 8, wherein the processor is further configured to invoke the set of program codes to transmit a sharing request to the other mobile communication terminal in communication with the mobile communication terminal when the mobile communication terminal detects that a pre-stored EHPLMN list does not contain the network identifier of the PLMN corresponding to the current location, whereby the other mobile communication terminal transmits the graphic two-dimensional barcode containing the EHPLMN list to the mobile communication terminal.

12. The mobile communication terminal of claim 11, wherein the processor is further configured to invoke the set of program codes to:
detect the type of a user identification card inserted into the mobile communication terminal for the first time;
determine PLMNs of network standards supported by the mobile communication terminal according to the type of the user identification card; and
add network identifiers of the PLMNs of the network standards supported by the mobile communication terminal to the pre-stored EPLMN list.

13. The mobile communication terminal of claim 12, wherein the processor being further configured to invoke the set of program codes to adopt the preset PLMN list other than the EHPLMN list to perform network access comprises:
when a PLMN other than the EHPLMN list and matching with a network identifier of the pre-stored EHPLMN list is found, the processor being configured to invoke the set of program codes to establish a communication connection between the mobile communication terminal and the PLMN matched.

14. The mobile communication of claim 8, wherein the processor is further configured to invoke the set of program codes to incorporate an EHPLMN list transmitted by the other mobile communication terminal in communication with the mobile communication terminal into the EHPLMN list already stored in the mobile communication terminal.

15. A non-transitory computer storage medium, the computer storage medium storing one or more programs, when the one or more programs are invoked by a mobile communication terminal, the mobile communication terminal performing operations comprising:
determining the current location of the mobile communication terminal;
receiving a graphical two-dimensional barcode transmitted by another mobile communication terminal in communication with the mobile communication terminal;
decoding the graphic two-dimensional barcode to acquire an equivalent home public land mobile network (EHPLMN) list to which the graphic two-dimensional barcode points; and
performing network access according to the EHPLMN list when the mobile communication terminal detects that the EHPLMN list contains a network identifier of a PLMN corresponding to the current location.

16. The non-transitory computer storage medium of claim 15, wherein the operations further comprise:
receiving a network identifier of a PLMN transmitted by a base station before performing network access according to the EHPLMN list by the mobile communication terminal;
when the mobile communication terminal detects that the EHPLMN list contains the network identifier of the PLMN corresponding to the current location, performing network access according to the EHPLMN list by the mobile communication terminal comprises:
detecting whether the EHPLMN list contains the network identifier of the PLMN received by the mobile communication terminal when the mobile communication terminal detects that the EHPLMN list contains the network identifier of the PLMN corresponding to the current location; and
accessing a network corresponding to the network identifier of the PLMN received by the mobile communication terminal when the mobile communication terminal detects that the EHPLMN list contains the network identifier of the PLMN received by the mobile communication terminal.

17. The non-transitory computer storage medium of claim 15, wherein the operation further comprise:
adopting a preset PLMN list other than the EHPLMN list to perform network access when the mobile communication terminal detects that the EHPLMN list does not contain the network identifier of the PLMN corresponding to the current location.

18. The non-transitory computer storage medium of claim 15, wherein the operations further comprise:
transmitting a sharing request to the other mobile communication terminal in communication with the mobile communication terminal when the mobile communication terminal detects that a pre-stored EHPLMN list does not contain the network identifier of the PLMN corresponding to the current location, whereby the other mobile communication terminal transmits the graphic two-dimensional barcode containing the EHPLMN list to the mobile communication terminal.

19. The non-transitory computer storage medium of claim 18, wherein the operations further comprise:
detecting the type of a user identification card inserted into the mobile communication terminal for the first time;
determining PLMNs of network standards supported by the mobile communication terminal according to the type of the user identification card; and
adding network identifiers of the PLMNs of the network standards supported by the mobile communication terminal to the pre-stored EPLMN list.

20. The non-transitory computer storage medium of claim 17, wherein adopting the preset PLMN list other than the EHPLMN list to perform network access comprises:
when a PLMN other than the EHPLMN list and matching with a network identifier of the pre-stored EHPLMN list is found, establishing a communication connection between the mobile communication terminal and the PLMN matched.

* * * * *